INVENTOR.
DONALD A. PERREAULT
BY Stanley Z. Cole
ATTORNEY

INVENTOR.
DONALD A. PERREAULT

BY Stanley Z. Cole

ATTORNEY

Jan. 13, 1970 D. A. PERREAULT 3,489,848

FACSIMILE SEMI-AUTOMATIC ADJUSTABLE TAPPED DELAY LINE EQUALIZER

Filed Aug. 25, 1966 5 Sheets-Sheet 3

INVENTOR.
DONALD A. PERREAULT

BY Stanley Z. Cole

ATTORNEY

INVENTOR.
DONALD A. PERREAULT
BY Stanley Z. Cole
ATTORNEY

INVENTOR.
DONALD A. PERREAULT
BY Stanley Z. Cole
ATTORNEY

United States Patent Office 3,489,848

Patented Jan. 13, 1970

3,489,848

FACSIMILE SEMI-AUTOMATIC ADJUSTABLE TAPPED DELAY LINE EQUALIZER

Donald A. Perreault, Pittsford, N.Y., assignor to Xerox Corporation, Rochester, N.Y., a corporation of New York Filed Aug. 25, 1966, Ser. No. 575,134
Int. Cl. H04n 1/38
U.S. Cl. 178—5 7 Claims

ABSTRACT OF THE DISCLOSURE

A facsimile semi-automatic system for optimally adjusting a tapped delay line equalizer at a synchronous facsimile receiver to correct for pulse distortion arising in transmission. A test signal from a remote transmitter is repetitively sampled at predetermined times and the sample voltages are displayed as light spot positions at the facsimile recorder to permit simple adjustment by untrained personnel.

This application relates to means and methods for equalization in digital communication systems and, more particularly, in facsimile communication systems.

It is a principal object of the invention to provide semi-automatic means and methods for achieving optimum adjustment of a delay line equalizer in a digital facsimile receiver. Further objects will become apparent in connection with the following explanation and description of the invention and the drawings in which.

Figure 1:
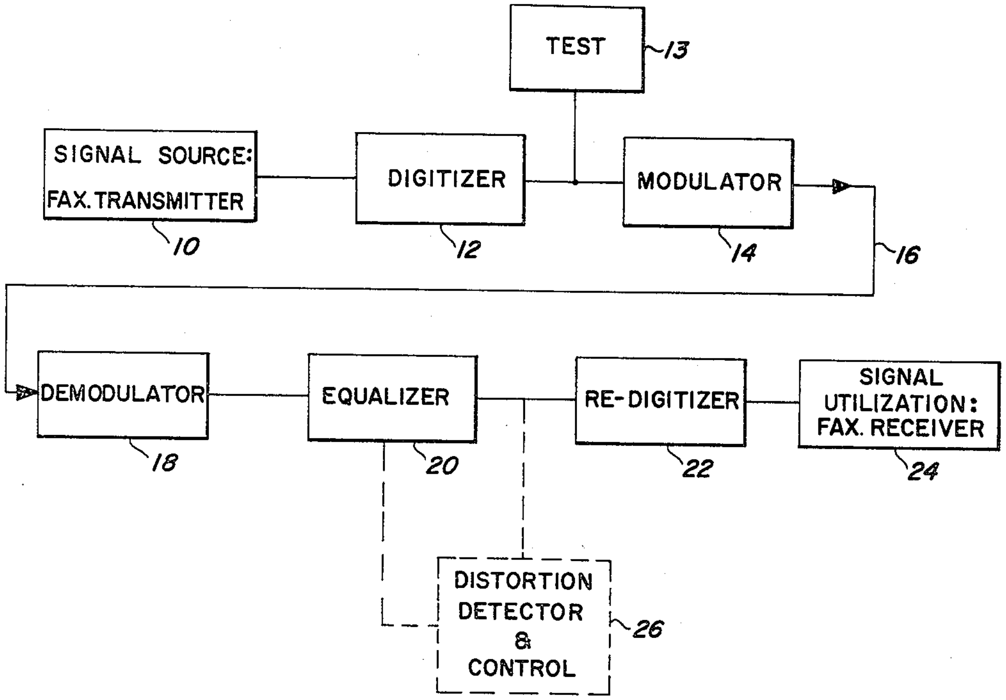
FIG. 1 is a digital transmission circuit.

FIG. 1 is a block diagram of a digital transmission system, not limited to the present invention. A baseband signal source 10, illustratively a facsimile transmitter, produces an information bearing waveform which is converted to digital format in a digitizer 12 which samples the waveform and permits changes in the transmitted signal level only at uniform increments of time determined by a clock signal generator. Most commonly, the output signal has only two discrete signal levels, but as far as the present invention is concerned, any number of levels may be employed. For the purposes of the present invention a test pulse generator 13 is also provided to optionally transmit a uniformly spaced series of unit pulses. Where the transmission distance is very short, the digital baseband signal may itself be transmitted, but ordinarily the baseband signal is modulated by modulator 14 to some other region of the frequency spectrum and transmitted over a transmission circuit 16 to a demodulator 18. Transmission circuit 16 may consist of telephone cable, coaxial cable, radio circuits, microwave circuits, or some combination of them. Circuit 16 will itself frequently contain various types of repeater amplifiers, multiplexers, demodulators, and modulators at various points along its length. These remits are generally different from elements 14 and 18 and are for the purpose of facilitating the long distance transmission of many types of signals singly and in combination. They also introduce distortions. The demodulated signal from demodulator 18 may be passed through an equalizer 20 before going to a redigitizer 22 which restores the signal, as far as possible, to that produced in digitizer 12 by sampling the incoming signals at discrete intervals determined by a clock generator synchronized with that in digitizer 12, to produce an output signal having transitions limited to said clock times. The resulting signal is applied to some form of utilization device 24 which may illustratively be a facsimile receiver. If equalizer 20 is adjustable, then some form of detector or control circuit 26 will be employed to permit optimum adjustment of the equalizer. The present invention is concerned primarily with elements 20 and 26.

If the transmission circuit 16 had infinite bandwidth and zero distortion, then the output of demodulator 18 would be the same as the input to modulator 14 and the output of the redigitizer circuit 22 would be the same as the output of either circuits 12 or 18. In practice, however, the transmission circuit bandwidth is limited to a value between a few hundred cycles and a few megacycles and the clock frequency is comparable to the bandwidth. Under these conditions, the output of demodulator 18 may not be the same as the input to modulator 14 but the output of redigitizer 22 should nevertheless be a replica of the output of digitizer 12. However, transmission circuit 16 almost always has considerable distortion, particularly phase distortion, i.e., a frequency dependent transmission time.

Figure 2:
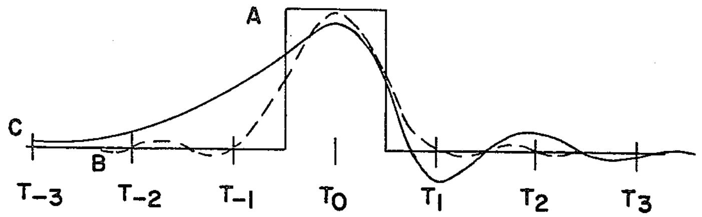
FIG. 2 shows pertinent waveforms encountered in the invention.

The effects of limited frequency response and of phase distortion can be seen in the waveforms of FIG. 2, where the timing marks are spaced one clock unit apart. Waveform A represents an idealized one-bit digital pulse, having a unit amplitude and a one unit duration centered about time $T_0$. If this signal were passed through a transmission circuit of limited bandwidth but with a linear phase response and one of certain ideal amplitude vs. frequency response characteristics, the waveform at the output of demodulator 18 would be similar to that shown as B. The exact shape of the received waveform will depend on the particular frequency response characteristic of the circuit, but the waveform will always show zero amplitude at every clock time except $T_0$, and the amplitude at $T_0$ will be proportional to the amplitude of the input signal A. Any arbitrary sequence of transmitted pulses can be recreated at the receiver in redigitizer 22, because the received signal amplitude at any clock time is representative of the amplitude of a single transmitted pulse only.

The signal received over an actual transmission circuit is quite different as shown, for example, in waveform C. Here the received waveform is spread over a time interval many times longer than that of the input pulse and has a substantial value at many clock times other than $T_0$. A waveform passed through a band limited transmission circuit will have zeroes at all clock times except $T_0$ only if the phase response is linear *and* the amplitude response has one of certain ideal shapes. Deviations from ideal amplitude response will distort the received signal in a manner analogous to that produced by deviations from linear phase. Amplitude deviations produce pulse distortion symmetrical about $T_0$; phase deviations produce pulse distortions asymmetrical about $T_0$. Usually signals suffer from both phase and amplitude distortion although phase is often the limiting parameter since most transmission facilities were historically designed for voice transmission which is almost immune to the effects of phase distortion. When an arbitrary sequence of pulses is transmitted over a circuit having these non-ideal characteristics, the received signal amplitude at any particular clock time may represent a super-position of a number of input pulses, making it impossible for the redigitizer to accurately determine the transmitted pulse amplitudes, or even the presence or absence of a transmitted pulse. The difficulties in recreating the transmitted signal become progressively worse as the clock frequency is increased relative to the transmission circuit bandwidth, as the phase distortion becomes worse, and as the number of transmitted signal levels increases.

The phase and amplitude distortion of any particular transmission circuit 16 can be compensated by an appropriate equalizer 20. However, many communication systems employ a number of different transmitters and receivers which may be connected together in various combinations, each such transmitter-receiver pair involving a different transmission circuit with different distortion characteristics. In the past, this problem has been met by using compromise equalizers which correct for average amplitude and/or phase distortion characteristics rather than for those associated with any specific transmission circuit. With the present emphasis on the reduction of transmission costs by increasing the transmission rate over any particular circuit, through the use of higher clock frequencies, multi-level transmission and the like, it becomes more and more important to achieve optimum equalization for every transmission circuit encountered in order to permit maximum transmission rate with minimum errors.

Figure 3:
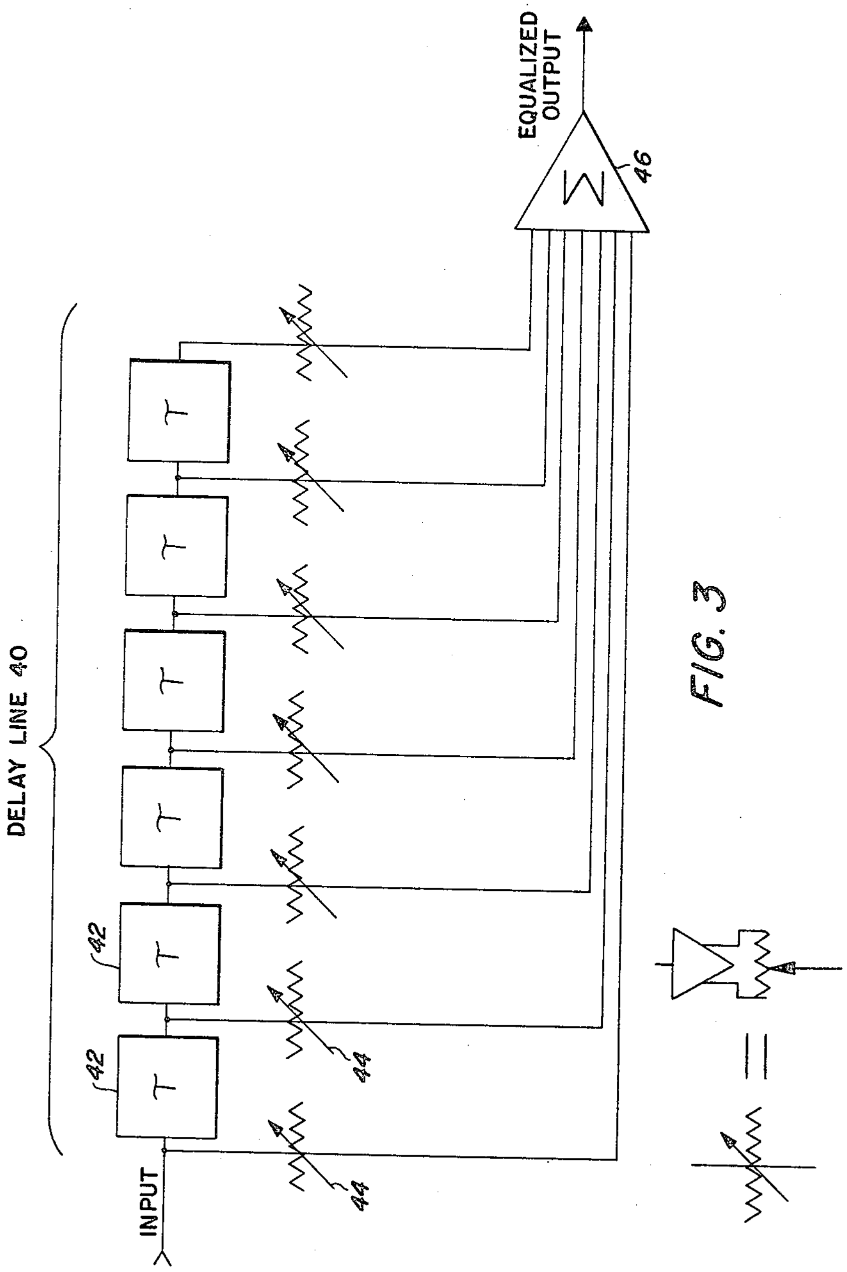
FIG. 3 shows a basic delay line equalizer.

FIG. 3 shows a type of equalizer circuit which can be adjusted to compensate for any transmission circuit characteristic. The circuit includes a tapped delay line 40 which is composed of a number of individual sections 42, each having a delay time which is exactly equal to the clock signal interval of the transmission circuit in which the equalizer is to be employed. Ordinarily, an even number of sections will be employed providing an odd number of taps. A six-section filter is shown for illustrative purposes only, since the exact number of sections employed will depend upon the maximum amount of distortion which can be tolerated after equalization. Each tap is connected through a gain control 44 to a summing circuit 46 which produces an equalized output signal proportional to the sum of the input signals. The gain controls are of the type which can reverse the polarity of the applied signal as well as changing its amplitude. As shown, an ordinary potentiometer will perform this function if the two terminals of the stationary element are fed with signals of opposite polarity, proportional to the output of the delay line tap, and the output is taken from the sliding contact. Since the middle gain control ordinarily controls the amplitude of the equalized output, it can be an ordinary attenuator or can be eliminated altogether and replaced by a simple gain control element at the input to the delay line or elsewhere in the receiver.

Proper adjustment of gain controls 44 will produce an output signal which is zero at time $T_{-3}$, $T_{-2'}$, $T_{-1'}$, $T_{1'}$, $T_{2'}$, $T_{3'}$. The use of additional sections in delay line 40 would make it possible to bring the signal to zero at additional times as well.

The adjustment of gain controls 44 is not simple since the controls interact significantly with each other and in a complex manner. Fully automatic circuits for optimizing the equalizer adjustments have been developed but they are too expensive and complex for use with a relatively low cost signal utilization device such as a facsimile receiver. In accordance with the present invention, there is shown a simple modification to a facsimile receiver which displays unambiguous adjustment instructions such that an unskilled operator can quickly optimize the equalizer adjustment.

Figure 4:
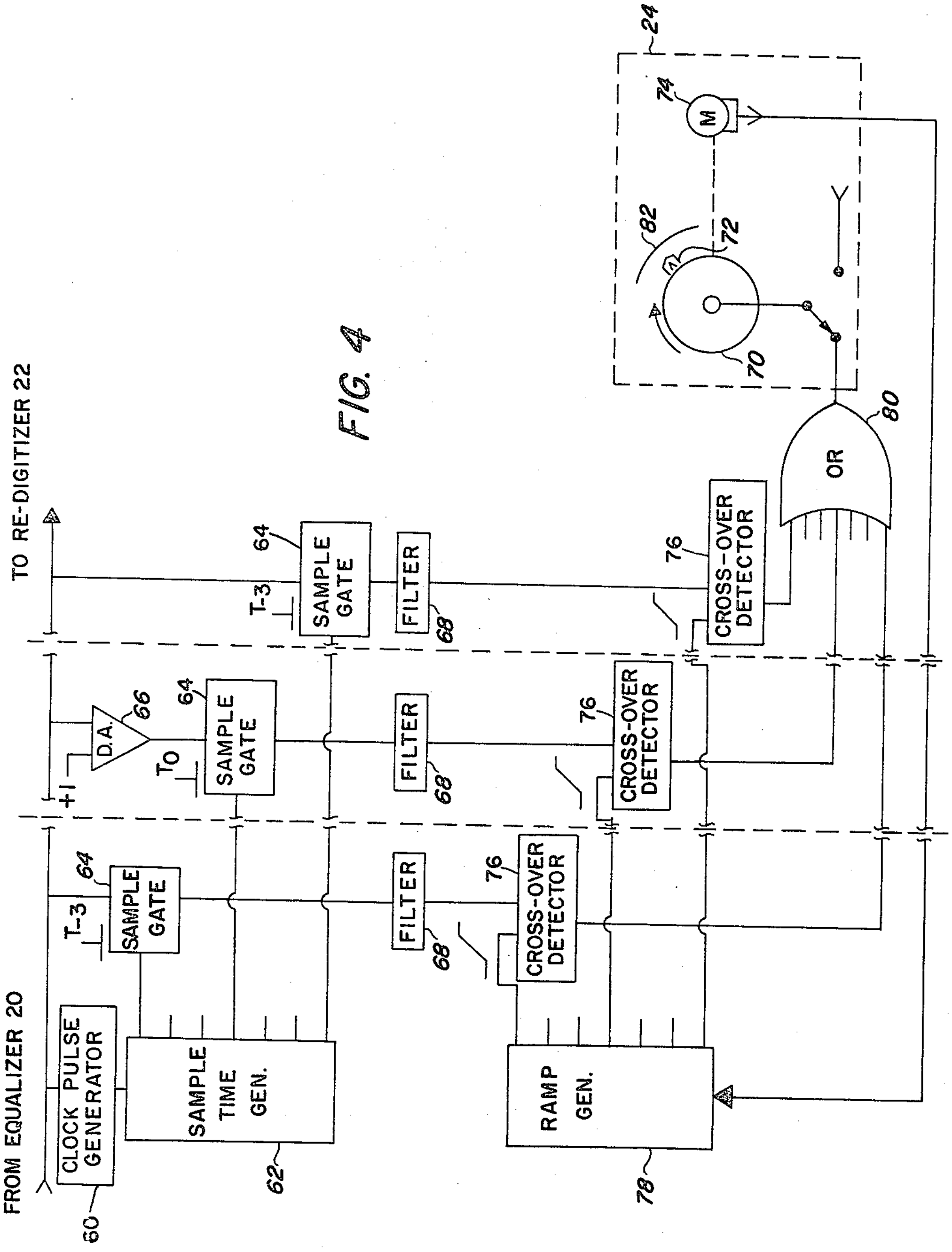
FIG. 4 shows one form of circuit according to the invention.

FIG. 4 shows an embodiment of the invention designed to work with a particular type of facsimile receiver 24 using as its recording element a rotating disc 70 incorporating at least one lamp 72 on its periphery and driven by motor 74. Means to move a curved sheet of recording paper past disc 70, or to move disc 70 axially with respect to the paper, will be included in a practical receiver but are not shown in this figure. The remote transmitter initially sends a test signal consisting of pulses equal in length to the transmission clock interval and uniformly spaced apart at least enough so that the distorted received signals from demodulator 18 do not overlap. The signals are applied to a clock pulse generator 60 to bring it into synchronism with the received signals. Since a digital facsimile receiver always requires a clock signal, clock 60 may supply signals to the facsimile receiver or conversely, a synchronized clock generator provided in the receiver may be used instead of the illustrated clock generator 60. The clock pulses are applied to sampling time generator 62 which, in response thereto, generates a sequence of output pulses for each incoming pulse. Each output pulse appears at a different terminal and corresponds to a sampling time as shown in FIG. 2. As many such timing pulses are provided as there are taps on delay line 40 of FIG. 3. The incoming signals are also applied in parallel to sampling gates 64. Each output of sampling time generator 62 is connected to a corresponding sampling gate which passes the incoming signal for a brief instant. The output of each sampling gate as shown in FIG. 2, is thus a pulse representing the amplitude of the incoming pulses at one of a set of discrete times spaced apart by the basic clock interval common to the entire digital transmission system. Optionally, the input to the $T_0$ sampling gate is first passed through differential amplifier 66 so as to provide an input signal which is not the amplitude of the signal received from demodulator 18 but, rather, the difference between that signal and the desired pulse amplitude.

Each of the sampling gates 64 is connected to a low-pass filter 68 which functions as a storage element to store the sampling signals at least from one sample to the next. The output of each filter is connected to one input terminal of a corresponding cross-over detector 76. The other input terminal of each detector 76 is connected to an output of ramp generator 78 which is timed with respect to rotating disc 70. Each output of ramp generator 78 is a ramp voltage which is short with respect to the rotation of disc 70 and each output is displaced in time from the others. When the ramp voltage supplied to a particular crossover detector 76 crosses the input voltage from a filter 68, an output pulse is developed which passes through a linear OR circuit 80 to energize lamp 72 on rotating disc 70. A screen 82, preferably made of phosphorescent material, is positioned adjacent to disc 70 and the flash of light from lamp 72 produces an illuminated spot on screen 82. The timing of each spot, and hence its position on screen 82, will depend upon the voltage applied to the corresponding crossover detector from its associated filter. The resulting display on screen 82 will resemble that shown in FIG. 5. The position of each spot 84 with respect to a reference line 86 marked on screen 82 represents the value of the test signal at a particular sampling time at which the signal should ideally be zero, except for the displacement of the spot from the central reference mark which indicates the departure of the test signal from the desired normalized value. If differential amplifier 66 in FIG. 4 is omitted, the corresponding reference mark can be shifted to reflect the proper spot position for the standard pulse amplitude.

Figure 5:
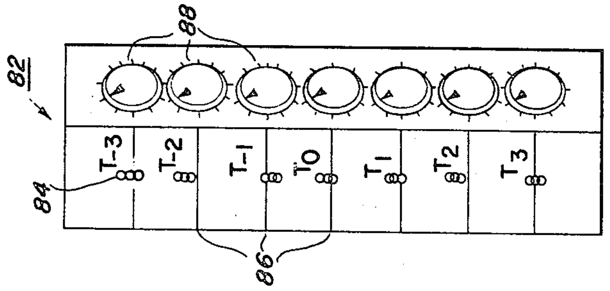
FIG. 5 shows the display produced by the circuit of FIG. 4.

According to a known theory for converging upon the optimum adjustment of gain controls 44, each spot displacement is used to control the adjustment of a corresponding gain control. The control knob 88 of each gain control may be located adjacent the corresponding spot. If a spot is displaced in one direction (indicating a sample voltage or a too high central peak) of the same polarity as the central peak of the test signal then the corresponding gain control is decreased by one unit. If a spot is displaced in the other direction, the gain control is increased one unit. If a spot is on the reference line, no change is made. In order to converge upon the optimum adjustment, the change for each gain control is first determined, all gain controls are adjusted by the predetermined amounts, and only after these initial adjustments are made are the spots re-examined to determine the next adjustment. Repetition of this process will lead to an optimum adjustment whereas an attempt to correct one spot position with its associated gain control and then correct the next spot position, etc. may lead to progressively worse results. For operator convenience, the gain control adjusting knobs 88 may be placed adjacent to screen 82 as shown in FIG. 5.

As correct equalization is approached, the signals sampled at times other than $T_0$ will become small and the signal to noise ratio of the samples will be degraded, making it more difficult to determine the true signal polarity which must be known in order to determine the proper gain control adjustments. In the illustrated invention, this problem is overcome in two complementary ways. First of all, filters 68 provide a certain amount of averaging of successive signal samples. Second, the eye of the observer can readily integrate the scattered successive spot positions to determine the average or true signal-determined spot position. This is particularly true if a phosphorescent screen is employed so that many successive spots are simultaneously visible.

Figure 7:
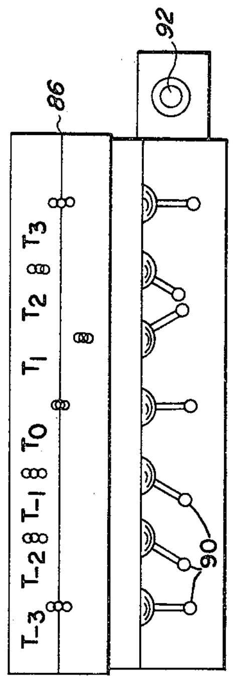
FIG. 7 shows in-line display produced by the circuit of FIG. 6.
Figure 6:
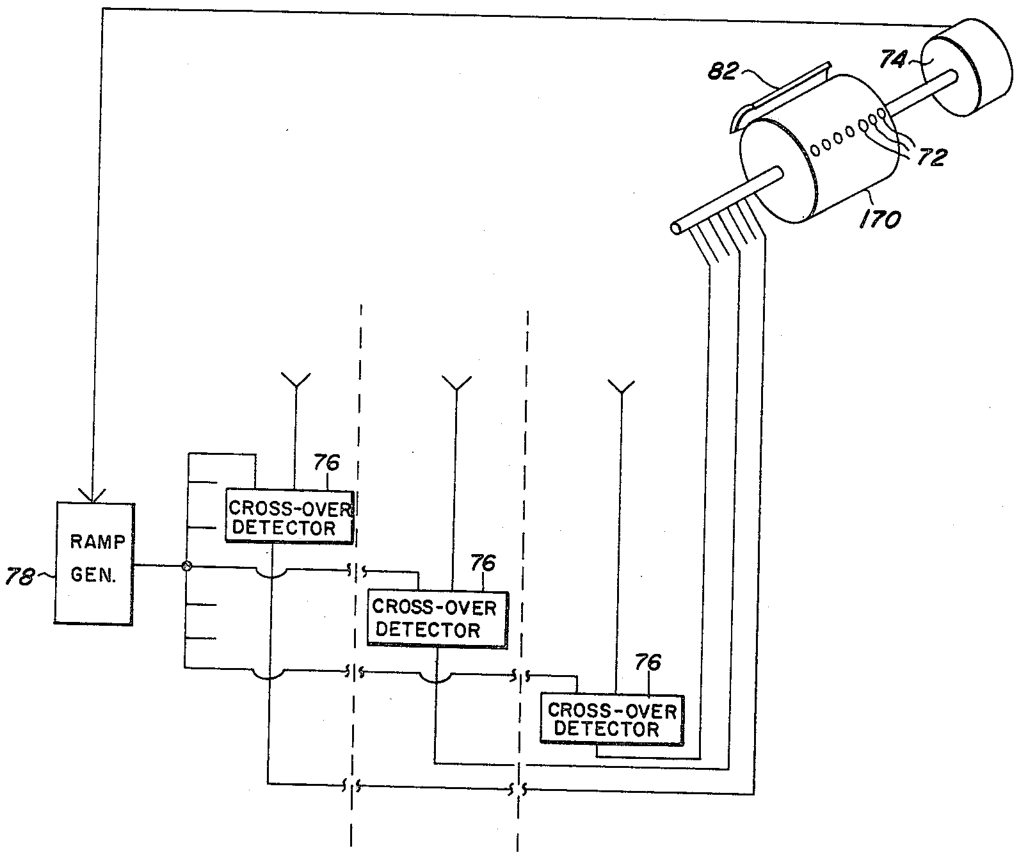
FIG. 6 shows a different form of circuit according to the invention.

FIGURE 6 shows a different embodiment of the invention in which the spot displacements are all referenced to a single line. Disc 70 of FIG. 4 is replaced by drum 170 and a plurality of lamps 72 is positioned on the surface of the drum along a line parallel to the axis. Each crossover detector 76 is connected in parallel to a single output of ramp generator 78 and the output of each crossover detector is connected to an individual lamp on drum 170. The other components of FIG. 4 have been omitted for simplicity. The display on screen 82 will now take the form shown in FIG. 7. Again, the gain control knobs can be positioned immediately above or below the corresponding display spots. As an alternative embodiment there is illustrated a three position lever 90 beneath each spot position and a single actuating button 92. The three positions of each lever correspond respectively to a positive increment of gain, no change of gain, and a negative increment in gain. After the operator has determined whether the average position of the particular spot is above or below or on reference line 86 he sets the corresponding lever 90 to the appropriate position. After all the levers are set the presses actuating button 92 which adjusts each gain control as determined by the lever settings. The operator rechecks the spot positions, resets the levers, presses the actuating button and repeats this process until all the spots are centered on the reference line. This represents the best equalization that can be obtained with the given equalizer, and the transmitter can thereupon terminate the transmission of test pulses and commence transmitting facsimile video signals which can be recorded in the facsimile receiver.

Figure 8:
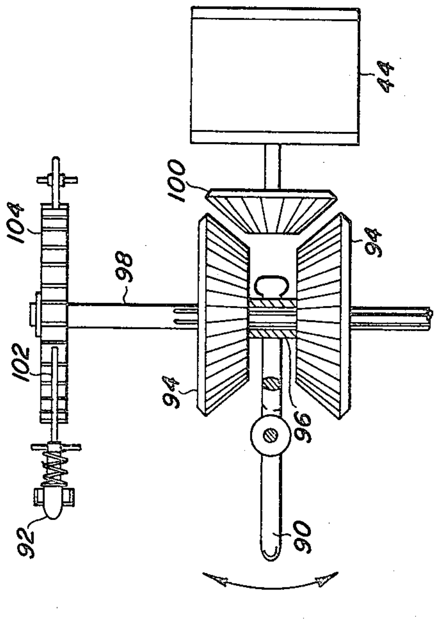
FIG. 8 shows a multiple preset apparatus.

FIG. 8 illustrates one way of actuating the gain controls in response to setting levers 90. For each gain control 44 there is provided a pair of opposed bevel gears 94 which are mounted on a common splined hub 96 which engages a spline shaft 98. The setting lever 90 slides the bevel gears back and forth along the spline shaft so that either one or the other of the bevel gears, or neither, engages a bevel pinion 100 connected to gain control 44. In this way, the bevel pinion can be made to remain stationary or rotate in either of two directions as spline shaft 98 is incrementally rotated in a single direction in response to operating button 92 which pushes a pawl 102 against a ratchet wheel 104 mounted on spline shaft 98, thus giving the spline shaft a uniform increment of rotation. The setting apparatus shown in FIGURES 7 and 8 has the advantage of constraining the operator to follow the adjustment procedure which by iteration will achieve optimum equalization, and discouraging the operator from manipulating the knobs in a non-optimum manner.

The preceding description and drawings merely illustrate some of the many ways in which the invention can be carried out. A few other ways will be suggested but many more will occur to those skilled in the art. A display of the type shown in FIG. 7 can also be achieved with a single lamp by actually stepping screen 82 with respect to disc 70 or by actually stepping disc 70 axially with respect to screen 82. Some types of facsimile printers include provisions for such axial stepping. Even if the facsimile recorder disc or drum employs a pressure stylus or other non-optical recording element, a lamp can readily be installed for use in the equalization procedure. A viewing screen can also be used to intercept the light beam from cathode ray or rotating prism facsimile recorders. Whenever facsimile recording takes place through the rotation of some type of shaft-carried device, it is a simple matter to add a disc or drum of the type shown in FIGURES 4 and 6. Furthermore, a projected display is not at all essential to the invention. A standard facsimile recorder can always be used to record a display, at least a display of the type shown in FIG. 5. Such a recorded display is actually easier to interpret and requires no modification of the recording apparatus. The only disadvantage is that a short period of time must normally elapse before the recorded display is visible to the operator, thus increasing the total time required to achieve equalization.

The present invention permits a very sophisticated equalization of the received signal at a facsimile receiver with a minimum of investment in complicated equipment and a minimum of required operator training or skill. This is particularly valuable where facsimile transmissions are carried over the ordinary dial telephone system, because the narrow band width of telephone lines makes it desirable to obtain the maximum possible information handling capacity from the lines in order to minimize the time required to transmit a document by facsimile, and because these lines tend to have severe phase and amplitude distortion which may vary substantially from circuit to circuit.

What is claimed is:

1. A baseband equalization system for use with a digital facsimile receiver to correct transmission distortion, said system comprising:

a multitap baseband delay line, the delay between each tap being equal to the transmission system clock interval;

a variable positive-through-negative gain control connected to at least each tap but one;

summing means connected to the output of each gain control and to any tap not having a gain control to form a corrected baseband output signal;

sampling means to repetitively sample isolated one clock interval signals in said corrected output signal at a sequence of sampling times spaced by said clock interval and at least equal in number to said delay line taps, said sampling means being synchronized with said signals so that a central one of said sequence sampling times occurs at the peak of said signal;

means to store the samples obtained by said sampling means; and means synchronized to said facsimile receiver to display each said stored sample at a scan position in said facsimile receiver related to the value of said sample, whereby the position of each said display sample indicates the required adjustment of a corresponding gain control to optimize equalization.

2. The system of claim 1 whereby each sample is displayed along a single line and displaced therefrom in proportion to its amplitude.

3. The system of claim 1 in which the central sample is displaced in proportion to its departure from a normalized voltage and all other samples are displaced in proportion to their departure from zero voltage.

4. The system of claim 1 further including means to preset the required direction of change for each gain control and single means to simultaneously adjust each preset gain control by a fixed increment in the preset direction.

5. The system of claim 3 wherein said display means includes light means mounted on a scan turret in said facsimile receiver and flashing in response to said stored samples, screen means adjacent to said light means to receive the light flashes emitted from said light means, and indication means on said screen means for indicating said normalized voltage for said central sample and said zero voltage for said other samples, said variable positive-through-negative gain control means adjusting said light flashes with reference to said indication means.

6. The system of claim 2 wherein said display means includes light means mounted along a line parallel to the axis of a scan drum in said facsimile receiver and flashing in response to said stored samples, screen means adjacent to said light means to receive the light flashes emitted from said light means, and indication means on said screen means for indicating said displayed amplitude for said stored samples, said variable positive-through-negative gain control means adjusting said light flashes with reference to said indication means.

7. The system of claim 4 wherein said means to preset includes bevel pinion means coupled to each of said variable positive-through-negative gain control means, opposed bevel gear means for adjustably engaging each of said bevel pinion means, and setting lever means for selectively engaging either of said opposed bevel gear means to said bevel pinion means, wherein said single means includes a pawl and ratchet wheel to advance said bevel gear means a predetermined amount of rotation.

References Cited

UNITED STATES PATENTS

| | | | |
|---|---|---|---|
| 2,942,195 | 6/1960 | Dean | 333—70 X |
| 3,003,030 | 10/1961 | Oshima et al. | 178—69 |
| 3,289,108 | 11/1966 | Davey et al. | 333—18 |
| 3,292,110 | 12/1966 | Becker et al. | 333—18 |
| 3,315,171 | 4/1967 | Becker | 328—163 |

ROBERT L. GRIFFIN, Primary Examiner

R. K. ECKERT, Jr., Assistant Examiner

U.S. Cl. X.R.

178—69; 328—164; 333—28, 29, 70